Patented Sept. 21, 1954

2,689,833

UNITED STATES PATENT OFFICE 2,689,833

RESINOUS QUATERNARY AMMONIUM ALKOXIDES

Jesse C. H. Hwa, Philadelphia, Pa., assignor to Rohm & Haas Company, Philadelphia, Pa., a corporation of Delaware No Drawing. Application September 21, 1951, Serial No. 247,760

7 Claims. (Cl. 260—2.1)

This invention relates to resinous quaternary ammonium alkoxides and to a method for their preparation. It relates to quaternary ammonium alkoxides which are polymeric and are insoluble in organic liquids as well as in aqueous solutions. It relates to resinous products which are particularly useful as insoluble and easily separable catalysts for many organic chemical reactions.

This invention also provides a method for preparing such insoluble alkoxides; and the process comprises reacting an alcohol and an alkylene oxide which contains two or three carbon atoms; i. e. ethylene oxide, 1,2-propylene oxide or 1,3-propylene oxide, with any weakly basic anion-exchange resin which contains tertiary amino groups.

Weakly basic anion-exchange resins containing tertiary amino groups, which are employed in the instant invention, are well known. They are made, for example, by reacting a phenolaldehyde condensate or macromolecule with formaldehyde and a secondary amine according to the disclosure of U. S. Patents 2,356,151; 2,354,671 and 2,341,907 or by halomethylating a cross-linked, insoluble copolymer of a monovinyl hydrocarbon such as styrene and then aminating the halomethylated copolymer by reaction with a secondary amine according to the process of C. H. McBurney's application Serial No. 759,309 filed July 5, 1947, now Patent No. 2,591,574. In either case, tertiary amino groups become attached through methylene groups to the aromatic nuclei of the insoluble polymer or macromolecule. The tertiary amino groups impart anion-exchange properties to the product.

This invention is best illustrated by reference to one kind of weakly basic anion-exchange resin which can be converted to the quaternary ammonium alkoxides of this invention but it is not limited to only that kind of resin. Thus the process of this invention is particularly applicable to those resins which are cross-linked, insoluble copolymers of a monovinyl aromatic hydrocarbons, preferably styrene, and a minor amount of a divinyl aromatic hydrocarbon, preferably divinylbenzene, to the aromatic nuclei of which are joined tertiary amino, polar groups. The reaction is exemplified by the following representation wherein Pol stands for the insoluble macromolecule or polymer, to which are joined the respective, tertiary amino, polar groups represented by

and R″—OH stands for a monhydric alcohol:

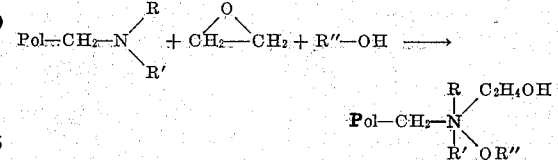

Of course when the propylene oxides are employed, the polar groups of the product have the formula

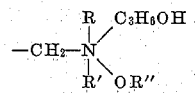

Within the scope of this invention the macromolecule or polymer to which the tertiary amino groups are joined is of secondary importance. The polymeric portion is a necessary part of an ion-exchange resin because it is the insoluble, infusible nucleus to which the polar groups are attached. But it remains inert so far as ion-exchange or the reaction of this invention is concerned. The functional tertiary amino groups are the ones which are important because they are the points at which ion-exchange occurs and also where reaction with the alkylene oxide takes place. If the polar groups in the weakly basic anion-exchange resin are primary or secondary amino groups, they are first converted to tertiary amino groups by exhaustive methylation, by reaction, for example, with formaldehyde and formic acid. It should also be noted that the groups which are attached to the tertiary amino nitrogen atoms are not affected by the reaction with the alcohol and alkylene oxide and that they are present in the polar groups of the final resinous quaternary ammonium alkoxide.

As indicated above, the weakly basic anion-exchange resins containing tertiary amino groups which are much preferred for the process of this invention are those described in C. H. McBurney's application Serial No. 759,309 filed July 5, 1947. Since they give much the best results, their preparation and their conversion to quaternary ammonium alkoxides is described hereinafter in detail. They are made by first preparing a cross-linked, insoluble polymer of an aromatic monovinyl hydrocarbon, chloromethylating the insoluble polymer with a secondary amine or a polyalkylenepolyamine whereby tertiary amino groups are joined to the aromatic nuclei.

The base polymer is most conveniently formed from styrene and divinylbenzene. Both of these materials are readily available and may be easily copolymerized by well known methods to give an insoluble polymer that possesses excellent physical and chemical properties. The divinylbenzene component of such a copolymer gives to the polymeric molecule a cross-linked structure which greatly increases the complexity of the molecule and decreases its solubility and compatibility with other materials. By varying the amount of the divinylbenzene used in the preparation of the copolymer, variations can be made in the physical properties of the polymeric material which carry through to the finished material. In general, the divinylbenzene component may vary from 0.1% to 40% of the total polymerizable materials on a molar basis. In practice, however, it is preferable to use at least 0.5% and for most purposes no benefit is derived from using over about 8%–10%.

In place of styrene other aromatic monovinyl compounds can be used and in place of divinylbenzene other polyvinyl aromatic compounds can be used. Ortho-, meta- and para-methyl styrenes, ortho-, meta-, and para-ethyl styrenes, and vinyl-naphthalene are suitable monovinyl aromatic compounds. Likewise, the divinyltoluenes, napththalenes, and xylenes as well as divinylethylbenzene and trivinylbenzene are suitable cross-linking polyvinyl aromatic compounds. What was said above concerning the amount of divinylbenzene as a cross-linking agent applies to these materials as well.

While it is preferable to use a polyvinyl aromatic compound to cross-link the polymeric molecule, the cross-linking can be accomplished by other means, one of which consists of the introduction of methylene bridges between the aromatic nuclei of a linear polymer of an aromatic monovinyl compound. This type of cross-linking is accomplished during the step of chloromethylating the polymeric material and is hereinafter explained in detail.

The base polymeric material may be formed by any of the known polymerization processes such as polymerization in mass, in solvents for the monomeric material or in emulsion or suspension in a liquid that is not a solvent for the monomeric material. The last is the preferred method because it produces the polymer directly in the form of small spheroids or beads, the size of which can be regulated and controlled.

As has been explained above, the porosity of the resin is dependent largely upon the percentage of cross-linking compound in the base polymer. A more porous resin is also formed if an inert solvent for the monomers which is immiscible with the suspending liquid is added to the monomers and, after polymerization, is removed by leaching, drying, or distilling from the hard polymerized particles.

The polymerization of the vinyl compounds is accelerated by means of well known catalysts which provide oxygen. These catalysts include ozone; organic peroxidic agents typified by ozonides, peroxides such as acetyl peroxide, lauroyl peroxide, stearoyl peroxide, tert.-butyl hydroperoxide, benzoyl peroxide, tert.-butyl perbenzoate, di-tert.-butyl diperphthalate, di-tert.-butyl peroxide, and the barium salt of tert.-butyl hydroperoxide; inorganic agents such as barium peroxide, sodium peroxide, hydrogen peroxide, and the so-called "per" salts such as the water-soluble perborates, persulfates, and perchlorates. The catalysts are employed in suitable amounts ranging from 0.1% to about 2.0% based on the weight of the monomeric material to be polymerized.

The next step in the preparation of the ion-exchange resins is that one in which the particles of insoluble, polymeric, aromatic hydrocarbon are chloromethylated. This can be done by means of various chloromethylating agents, but the procedure which is by far the most preferred is to treat the particles with chloromethyl ether and a Friedel-Crafts catalyst. During the step of chloromethylating, some cross-linking of the polymer by the chloromethylating agent can take place. The amount of such cross-linking appears to be inversely proportional to the amount of cross-linking already present prior to the chloromethylating step. In the preferred embodiment of this invention the particles of insoluble and cross-linked polymer are immersed in chloromethyl ether and an inert organic liquid which swells the particles of polymer. The word "inert" is used in its accepted sense to indicate that the organic liquid does not react with any of the other materials which are present. Very satisfactory swelling-liquids are the chlorinated aliphatic hydrocarbons such as ethylene dichloride, trichloroethane, tetrachloroethane, tetrachloroethylene and the like.

The extent of the chloromethylation reaction is conveniently determined by a halogen analysis. It is desirable that as many chloromethyl groups as possible be introduced into the insoluble copolymer because the number of such groups determines the number of quaternary ammonium alkoxide groups in the final product. The number of such groups should be at least one for every fifteen aromatic hydrocarbon nuclei in the polymer and most satisfactory products are obtained from a chloromethylated polymer containing one to six chloromethyl groups for every four aromatic hydrocarbon nuclei.

After the chloromethylation reaction is complete, water is added in order to remove the Friedel-Crafts catalyst and any unreacted chloromethyl ether and the particles of chloromethylated resin are then separated, for example, by filtration.

The next step is the amination of the chloromethylated copolymer with a secondary amine. This reaction is preferably carried out by adding the amine to the chloromethylated polymer while the latter is suspended and agitated in a liquid, including water, which is a solvent for the amine. The mixture may be allowed to react at room temperature or, preferably, at elevated temperatures, after which the resin containing tertiary amino groups is freed from the liquid.

It has been found to be advantageous to swell the chloromethylated polymer prior to its reaction with the amine. This swelling facilitates the subsequent amination reaction and may be carried out by soaking the polymer in a suitable liquid, the most common of which are aromatic hydrocarbons, such as benzene and toluene, and chlorinated aliphatic hydrocarbons, such as ethylene dichloride, trichloroethane, tetrachloroethane, perchloroethylene, and the like.

The amines are best used in the form of the free base. The organic groups on the amino nitrogen atom are not altered in the reaction. Those amines are preferred in which the organic groups attached to the nitrogen atom, and represented above by R and R', are monovalent hydrocarbon groups, but it is true that other amines may be used wherein the hydrocarbon radical of the amine carries a substituent group such as an hydroxyl group, as in diethanolamine, or an amino group as in diethylenetetramine. Furthermore, compounds such as morpholine and pyrrolidine can be employed. The hydrocarbon portion of the amines; i. e. groups R and R' in the general formulas above, can be aliphatic, aromatic, cycloaliphatic, araliphatic and alkaromatic. The following typify those amines which are suitable in this invention when used individually or in mixtures with one another: dimethylamine, diethanolamine, diethylamine, dibutylamines, dicyclohexylamine, dibenzylamine, methylaniline, cyclohexylmethylamine, diphenylamine, dinaphthylamine, benzylethylamine, di-(p-ethyl)-phenylamine, and triethylenetetramine. When an amine such as diethylenetriamine is used, the aminated resin is subjected to exhaustive methylation in order to convert the amino groups to tertiary amino groups.

The final step, which is the improvement of this invention, comprises reacting the weakly basic anion-exchange resin, prepared in the above manner, with an alcohol and ethylene oxide or a propylene oxide under substantially anhydrous conditions. The tertiary amino groups of the resin are thereby converted to quaternary ammonium alkoxide groups as represented above. This is done by reacting the alkylene oxide and alcohol with the resin containing tertiary amino groups while the resin is suspended and agitated in the alcohol. Here again it is desirable to swell the resin, if it is not already swollen, by means of an organic liquid such as an aromatic hydrocarbon or a chlorinated aliphatic hydrocarbon. The particles of resin, while they are wet with and swollen by the organic liquid, are suspended in the alcohol and the reaction mixture, including the alkylene oxide, is maintained at a temperature from 0° C. to 100° C. Since some decomposition occurs at the higher temperatures and since the reaction is sluggish below normal room temperature, it is much preferred to carry out the reaction within the temperature range of about 20° C. to 60° C . The reaction is best conducted in a closed system.

The alkylene oxide can be bubbled into the alcoholic suspension of the resin or it can be cooled and added as a liquid. The resultant reaction is exothermic and during the reaction the particles of resin usually swell further as they react with the alcohol and alkylene oxide. While there is no limit, within reason, to the time during which the resin and the alkylene oxide can be reacted, it is advisable to carry on the reaction for at least two hours in order to assure a reasonable extent of reaction. In commercial practice a reaction period of 4 to 10 hours is recommended.

The alcohols which are employed are those containing one to eight carbon atoms. The rate of reaction decreases with the molecular size of the alcohol and conseqeuntly methanol and ethanol are preferred. Examples of the other operable alcohols include isopropyl, n-butyl, sec.-butyl, tert.-butyl, isoamyl, 2-ethylhexyl, benzyl alcohols and their homologues and isomers. It should be pointed out that while the alkoxides of monohydric alcohols are preferred because they are cheaper and more readily prepared, the corresponding alkoxides of ethylene glycol and glycerol have been made and that these are like the alkoxides of the monohydric alcohols in their catalytic activity and in their reaction with water.

The products of this invention are quaternary ammonium alkoxides and as such they resemble in their catalytic activity the alkoxides of the alkali metals, such as potassium methoxide or sodium ethoxide. They do have an advantage, however, over the latter in that they are insoluble in organic liquids and in organic reaction mixtures and can therefore be separated mechanically therefrom. When the products of this invention are brought into contact with water, they are hydrolyzed; and the quaternary alkoxide groups of the formula,

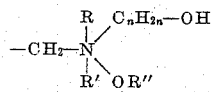

in which $n$ is an integer of value 2 to 3 and the characters R, R', and R'' have the significance described above, are converted to quaternary ammonium hydroxide groups,

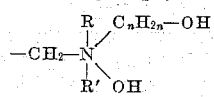

At the same time the alcohol, R''—OH, is liberated. This possibility of hydrolysis accounts for the maintenance of substantially anhydrous conditions during the preparation of the quaternary ammonium alkoxides. These quaternary ammonium resins are strongly basic and are excellent for the adsorption of anions from solutions. Their preparation by a more direct method is the subject of my application for Letters Patent, Serial No. 247,759 filed September 21, 1951.

The following example serves to illustrate the process of this invention which in its broadest aspects is a method of converting weakly basic anion-exchange resins containing tertiary amino groups into insoluble quaternary ammonium alkoxides.

*Example 1*

A. *Preparation of a base polymer.*—Into a container equipped with thermometer, mechanical stirrer and reflux condenser were poured 4000 parts of water and 340 parts of a 1.5% aqueous dispersion of magnesium silicate. Agitation was begun and a solution of 900 parts of styrene, 60 parts of ethylstyrene and 40 parts of divinylbenzene, containing 10 parts of dissolved benzoyl peroxide, was added. The stirred mixture was then heated to 90° C. and held there for 1.5 hours after which the mixture was heated at refluxing temperature for an additional 1.5 hours. The reaction mixture was then cooled to room temperature and the solid spheroids or beads of the copolymer were separated from the liquid by decantation and filtration, were air-dried, and were finally dried in an oven for two hours at 125° C.

B. *Preparation of the chloromethylated copolymer.*—Five hundred parts of the beads of the copolymer prepared in part A above were placed in a container equipped with stirrer, thermometer and reflux condenser. This amount corresponds to 5.0 moles of styrene in the form of a cross-linked copolymer. A thousand parts (12.5 moles) of chloromethyl ether, CH₃OCH₂Cl, were added together with 1000 parts of ethylene dichloride. Agitation was begun and the reaction mixture was cooled slowly to 0° C. by means of an ice-salt bath. During this period the particles swelled markedly. Three hundred parts (2.3 moles) of anhydrous aluminum chloride were added in small portions over a period of one hour, after which the mixture was stirred at 0° C. for two hours. Then 5000 parts of ice-water were slowly added in order to decompose the excess of aluminum chloride and chloromethyl ether. The resultant mixture was stirred for 30 minutes and filtered. The beads were washed with water and then subjected to steam-distillation for an hour in order to free them of ethylene dichloride. They were cooled rapidly, filtered, and dried at 65° C. for 24 hours. They contained 18.3% chlorine by analysis.

C. *Amination of the chloromethylated beads.*—In a container equipped with mechanical stirrer, thermometer, gas-inlet tube and reflux condenser were placed 144.3 parts (0.73 mole) of the chloromethylated beads prepared by the process of part B above. Three hundred parts of toluene were added and the mixture was boiled for an hour and then cooled to room temperature. While the mixture was stirred at 30°–35° C., 93.5 parts (2.1 moles) of dimethylamine were passed in. The mixture was then stirred at room temperature for 20 hours. The product was drained and thoroughly washed with toluene. The toluene was then removed and the resin was dried at 65° C. for 24 hours. The product, which contained 5.9% nitrogen, was a weakly basic anion-exchange resin which had a capacity for adsorbing acids of approximately 4.2 milliequivalents per gram. It did not, however, adsorb chloride ions to any extent from aqueous solutions of sodium chloride.

D. *Conversion of weakly basic anion-exchanger into a resinous quaternary ammonium alkoxide.*—Ninety-eight parts (equivalent to 0.41 mole) of the resinous product of part C above were mixed with 240 parts of methanol in a container equipped with mechanical stirrer, thermometer and reflux condenser to which a calcium chloride drying-tube was attached. The mixture of alcohol and resin was stirred for an hour at refluxing temperature and was then cooled to room temperature. To the cooled and stirred mixture was then added 44 parts (1.0 mole) of liquid ethylene oxide over a period of 0.5 hour. The exothermic reaction raised the temperature of the mixture to 45° C. The mixture was stirred at 40°–45° C. for 6 hours and then at room temperature overnight, after which it was filtered. The separated resin was washed thoroughly with methanol and the major portion was bottled wet with alcohol. The remainder was dried in an oven at 65° C. overnight.

Some of the dried product was stirred for 4 hours in an excess of a 4% solution of sodium chloride. Titration with standard hydrochloric acid showed that the resinous product had hydrolyzed to a material containing quaternary ammonium hydroxide groups and that the hydroxyl groups had replaced some of the chloride ions in solution. Thus the product had a quaternary ammonium anion-exchange capacity of 3.29 milliequivalents/gram or of 1.32 milliequivalents/ml.

Another portion of the alkoxide product was tested for catalytic activity in comparison with a quaternary ammonium anion-exchange resin in the hydroxyl form made by reacting the weakly basic anion-exchange resin, prepared by the process of parts A, B and C of Example 1 above, with ethylene oxide in the presence of water. Whereas the functional groups in the alkoxide resin had the formula

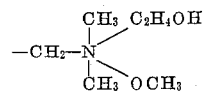

the corresponding groups in the comparative standard had the formula

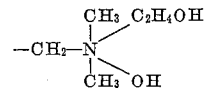

The same amount of each material was added to identical reaction mixtures of diethyl malonate and ethyl acrylate and the resultant mixtures were maintained under identical conditions at room temperature overnight after which they were filtered and distilled. The yield of triethyl 1,1,3-propanetricarboxylate under the catalytic influence of the quaternary ammonium alkoxide resin was three times as great as when the quaternary ammonium hydroxide resin was employed as catalyst.

I claim:

1. A process of preparing insoluble, infusible, polymeric quaternary ammonium alkoxides which comprises reacting a weakly basic, insoluble, infusible anion-exchange resin containing polar, tertiary amino groups with an alkylene oxide from the class consisting of ethylene oxide, 1,2-propylene oxide, and 1,3-propylene oxide and with an alkanol containing 1 to 8 carbon atoms at a temperature from 0° C. to 100° C. under substantially anhydrous conditions.

2. A process of preparing insoluble, infusible, polymeric quaternary ammonium alkoxides which comprises reacting a weakly basic, insoluble, infusible anion-exchange resin containing polar, tertiary amino groups with an alkylene oxide from the class consisting of ethylene oxide, 1,2-propylene oxide, and 1,3-propylene oxide and with an alkanol containing 1 to 8 carbon atoms at a temperature from 20° C. to 60° C. under substantially anhydrous conditions.

3. A process of preparing insoluble, infusible resins containing quaternary ammonium alkoxide groups having the formula

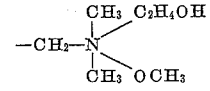

which comprises reacting ethylene oxide and methanol with a weakly basic, insoluble, infusible anion-exchange resin which contains polar, tertiary amino groups having the formula

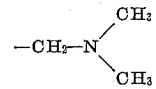

attached to the aromatic hydrocarbon nuclei of a cross-linked copolymer of 0.5% to 8% divinylbenzene and 92% to 99.5% styrene.

4. An insoluble, resinous, quaternary ammonium alkoxide prepared by the process of claim 1.

5. An insoluble, resinous, quaternary ammonium alkoxide prepared by the process of claim 3.

6. A process for preparing insoluble, infusible resins containing quaternary ammonium alkoxide groups having the formula

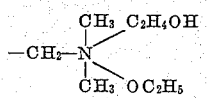

which comprises reacting ethylene oxide and ethanol with a weakly basic, insoluble, infusible anion exchange resin which contains polar, tertiary amino groups having the formula

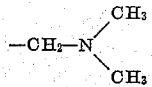

attached to the aromatic hydrocarbon nuclei of a cross-linked copolymer of 0.5% to 8% divinylbenzene and 92% to 99.5% styrene.

7. An insoluble, resinous, quaternary ammonium alkoxide prepared by the process of claim 6.

References Cited in the file of this patent

UNITED STATES PATENTS

| Number | Name | Date |
|---|---|---|
| 2,543,666 | Michael | Feb. 27, 1951 |
| 2,571,120 | De Groote | Oct. 16, 1951 |
| 2,614,099 | Bauman | Oct. 14, 1952 |